(12) United States Patent
Flores et al.

(10) Patent No.: US 8,381,130 B2
(45) Date of Patent: Feb. 19, 2013

(54) METHOD AND USER INTERFACE TOOL FOR NAVIGATION THROUGH GRID OF SCHEDULED ITEMS

(75) Inventors: Philip Flores, Los Angeles, CA (US); Peter Hollingsworth, Oakland, CA (US); Sahib Bal, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 924 days.

(21) Appl. No.: 11/606,647

(22) Filed: Nov. 29, 2006

(65) Prior Publication Data

US 2008/0126989 A1    May 29, 2008

(51) Int. Cl.
G06F 3/048 (2006.01)
G06F 3/00 (2006.01)

(52) U.S. Cl. ........ 715/833; 715/769; 715/782; 715/784; 715/848

(58) Field of Classification Search .................. 715/833, 715/769, 782, 784, 848; 725/38, 39, 40, 725/44

See application file for complete search history.

(56) References Cited

U.S. PATENT DOCUMENTS

| | | | | |
|---|---|---|---|---|
| 5,553,225 A * | 9/1996 | Perry | | 715/786 |
| 5,623,590 A * | 4/1997 | Becker et al. | | 715/772 |
| 5,850,218 A * | 12/1998 | LaJoie et al. | | 725/45 |
| 5,874,965 A * | 2/1999 | Takai et al. | | 345/667 |
| 6,034,683 A * | 3/2000 | Mansour et al. | | 715/764 |
| 6,154,771 A * | 11/2000 | Rangan et al. | | 709/217 |
| 6,222,547 B1 * | 4/2001 | Schwuttke et al. | | 345/419 |
| 6,380,953 B1 * | 4/2002 | Mizuno | | 715/764 |
| 6,412,008 B1 * | 6/2002 | Fields et al. | | 709/228 |
| 6,480,210 B1 * | 11/2002 | Martino et al. | | 715/848 |
| 6,486,896 B1 * | 11/2002 | Ubillos | | 715/784 |
| 6,519,771 B1 * | 2/2003 | Zenith | | 725/32 |
| 6,522,342 B1 * | 2/2003 | Gagnon et al. | | 715/716 |
| 6,642,939 B1 * | 11/2003 | Vallone et al. | | 715/721 |
| 6,661,438 B1 * | 12/2003 | Shiraishi et al. | | 715/835 |
| 6,664,984 B2 * | 12/2003 | Schlarb et al. | | 715/826 |
| 6,772,433 B1 * | 8/2004 | LaJoie et al. | | 725/52 |
| 6,828,989 B2 * | 12/2004 | Cortright | | 715/769 |
| 6,889,220 B2 * | 5/2005 | Wolff et al. | | 1/1 |
| 6,915,528 B1 * | 7/2005 | McKenna, Jr. | | 725/37 |
| 6,993,712 B2 * | 1/2006 | Ramachandran et al. | | 715/234 |
| 7,032,177 B2 * | 4/2006 | Novak et al. | | 715/723 |
| 7,051,111 B1 * | 5/2006 | Scullin | | 709/232 |
| 7,051,280 B1 * | 5/2006 | Ko | | 715/718 |
| 7,103,905 B2 * | 9/2006 | Novak | | 725/46 |
| 7,117,441 B2 * | 10/2006 | Allport | | 715/721 |
| 7,146,574 B2 * | 12/2006 | Goldthwaite et al. | | 715/838 |

(Continued)

*Primary Examiner* — Steven B Theriault
(74) *Attorney, Agent, or Firm* — SNR Denton US LLP

(57) ABSTRACT

Methods and software tools are described for allowing users to navigate through a time schedule quickly and easily. The time schedule interface facilitates a user viewing multiple time periods on an information schedule on a client device quickly without having to completely remake or redraw the entire interface. A user of a computer or similar device is presented with a time schedule interface. This schedule interface may resemble a schedule such as program guide or a train schedule. The schedule typically is composed of a grid or blocks of information defined by two parameters. One parameter is almost always time, while the other parameter depends on the type of schedule. The interface in this invention includes a moveable virtual slider. The slider rests on or is attached to a time scale axis. This time scale axis may be implemented as a horizontal or vertical bar and in addition may contain markings corresponding to time intervals much like a ruler. A user may select and control this slider along the time scale axis. The position of the slider along the time scale axis controls the time periods displayed in the schedule.

20 Claims, 6 Drawing Sheets

U.S. PATENT DOCUMENTS

| | | | |
|---|---|---|---|
| 7,203,952 B2 * | 4/2007 | Broadus | 725/40 |
| 7,275,163 B2 * | 9/2007 | Cocchi et al. | 713/193 |
| 7,292,774 B1 * | 11/2007 | Masters et al. | 386/291 |
| 7,320,137 B1 * | 1/2008 | Novak et al. | 725/134 |
| 7,433,885 B2 * | 10/2008 | Jones | 707/102 |
| 7,444,665 B2 * | 10/2008 | Cezeaux et al. | 725/112 |
| 7,496,945 B2 * | 2/2009 | Rodriguez | 725/51 |
| 7,574,665 B2 * | 8/2009 | Cortright | 715/768 |
| 7,631,328 B2 * | 12/2009 | Clancy et al. | 725/39 |
| 7,636,733 B1 * | 12/2009 | Rothmuller | 382/305 |
| 7,686,175 B2 * | 3/2010 | Waisanen | 212/315 |
| 7,688,322 B2 * | 3/2010 | Kapler et al. | 345/440 |
| 7,761,812 B2 * | 7/2010 | Ostojic et al. | 715/835 |
| 7,765,568 B1 * | 7/2010 | Gagnon et al. | 725/38 |
| 7,774,718 B2 * | 8/2010 | Finke-Anlauff et al. | 715/833 |
| 7,788,592 B2 * | 8/2010 | Williams et al. | 715/764 |
| 7,805,678 B1 * | 9/2010 | Niles et al. | 715/716 |
| 7,877,776 B2 * | 1/2011 | Krikorian et al. | 725/95 |
| 7,937,725 B1 * | 5/2011 | Schaffer et al. | 725/46 |
| 8,046,799 B2 * | 10/2011 | Noble | 725/52 |
| 2002/0085034 A1 * | 7/2002 | Cortright | 345/764 |
| 2002/0087982 A1 * | 7/2002 | Stuart | 725/39 |
| 2003/0016248 A1 * | 1/2003 | Hayes Ubillos | 345/800 |
| 2003/0018748 A1 * | 1/2003 | McKenna, Jr. | 709/219 |
| 2003/0018970 A1 * | 1/2003 | McKenna, Jr. | 725/37 |
| 2003/0084445 A1 * | 5/2003 | Pilat | 725/44 |
| 2003/0095791 A1 * | 5/2003 | Barton et al. | 386/83 |
| 2003/0122966 A1 * | 7/2003 | Markman et al. | 348/563 |
| 2003/0126599 A1 * | 7/2003 | Novak et al. | 725/32 |
| 2003/0197744 A1 * | 10/2003 | Irvine | 345/856 |
| 2004/0001081 A1 * | 1/2004 | Marsh | 345/721 |
| 2004/0243942 A1 * | 12/2004 | Cortright | 715/769 |
| 2004/0252119 A1 * | 12/2004 | Hunleth et al. | 345/440 |
| 2005/0015804 A1 * | 1/2005 | LaJoie et al. | 725/44 |
| 2005/0097606 A1 * | 5/2005 | Scott et al. | 725/52 |
| 2005/0108643 A1 * | 5/2005 | Schybergson et al. | 715/713 |
| 2005/0155067 A1 * | 7/2005 | McKenna, Jr. | 725/61 |
| 2005/0177861 A1 * | 8/2005 | Ma et al. | 725/135 |
| 2005/0210403 A1 * | 9/2005 | Satanek | 715/786 |
| 2005/0232167 A1 * | 10/2005 | Gilbert et al. | 370/260 |
| 2005/0251750 A1 * | 11/2005 | Vallone et al. | 715/721 |
| 2006/0026638 A1 * | 2/2006 | Stark et al. | 725/38 |
| 2006/0041927 A1 * | 2/2006 | Stark et al. | 725/139 |
| 2006/0080342 A1 * | 4/2006 | Takaki | 707/100 |
| 2006/0156237 A1 * | 7/2006 | Williams et al. | 715/720 |
| 2006/0250358 A1 * | 11/2006 | Wroblewski | 345/157 |
| 2006/0253874 A1 * | 11/2006 | Stark et al. | 725/62 |
| 2007/0061724 A1 * | 3/2007 | Slothouber et al. | 715/716 |
| 2007/0070066 A1 * | 3/2007 | Bakhash | 345/419 |
| 2007/0245238 A1 * | 10/2007 | Fugitt et al. | 715/700 |
| 2007/0288247 A1 * | 12/2007 | Mackay | 705/1 |
| 2008/0122870 A1 * | 5/2008 | Brodersen et al. | 345/634 |
| 2010/0146435 A1 * | 6/2010 | Cros | 715/786 |

* cited by examiner

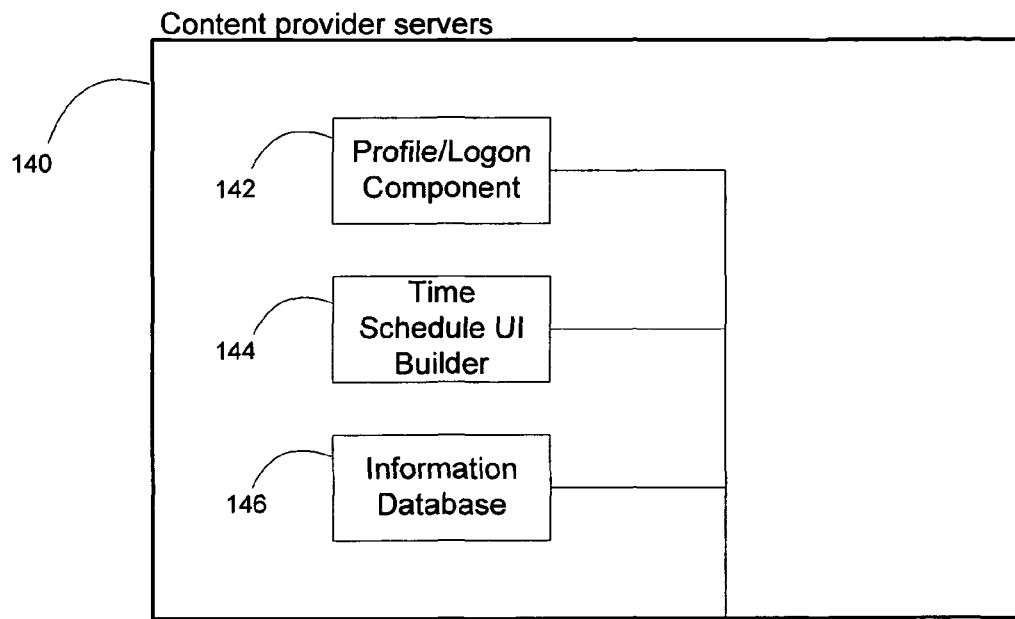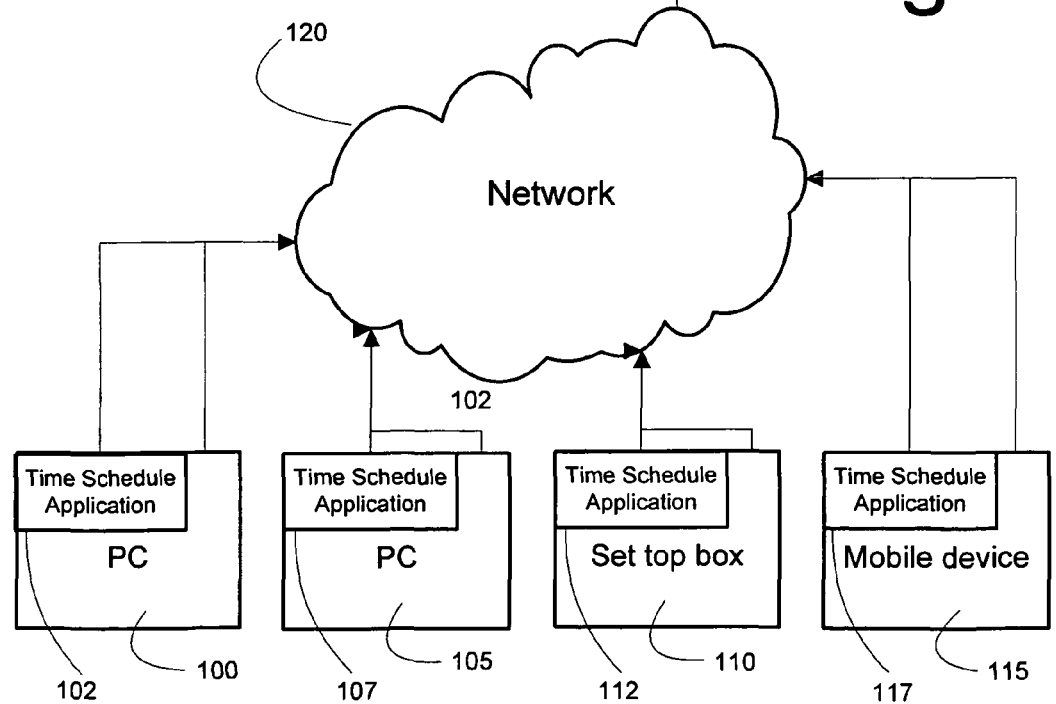
Fig. 1

Fig. 4

Fig. 5a
Slider dropped between
intervals
Slider snapped to closest interval
Fig. 5b

|   | Wednesday | | Thursday | | |
|---|---|---|---|---|---|
|   | 8PM 10PM | | 4AM 8AM 12PM | | |
|   | ←8PM | | ←9PM | ←10PM | |
| 2 | Sitcom A | Sitcom B | Reality Show A | Drama Series A | |
| 4 | Sports Event | | | | |
| 5 | Movie | | | | |
| 7 | Reality Show B | | Drama Series B | Newsmagazine | |

Fig. 6a

|   | Wednesday | Thursday | |
|---|---|---|---|
|   | 8PM 10PM | 4AM 8AM 12PM | |
|   | ←10PM | ←11PM | ←12AM |
| 2 | Drama Series A | Local News | Late Night Talk Show |
| 4 | Sports Event cont'd | Local News | Infomercial |
| 5 | Movie cont'd | Local News | Late Night Movie |
| 7 | Newsmagazine | Local News | Late Night Talk Show |

Fig. 6b

METHOD AND USER INTERFACE TOOL FOR NAVIGATION THROUGH GRID OF SCHEDULED ITEMS

CROSS REFERENCE TO RELATED REFERENCES

The present application is related to the following commonly owned U.S. Patents and Patent applications, the disclosures of which are each hereby incorporated by reference herein in its entirety:

U.S. patent application Ser. No. 11/498,459, filed Aug. 2, 2006, entitled SYSTEM AND METHOD FOR TAGGING CONTENT AND DELIVERING THE TAG TO BUDDIES OF A GIVEN USER;

U.S. patent application Ser. No. 11/497,864, filed Aug. 1, 2006, entitled SYSTEM AND METHOD FOR DELIVERING PERSONALIZED ADVERTISEMENTS;

U.S. patent application Ser. No. 11/497,864, filed Aug. 1, 2006, entitled METHOD FOR ALLOWING USERS TO ENGAGE IN A MOVIE THEATER VIEWING EXPERIENCE IN A DISTRIBUTED ENVIRONMENT;

U.S. patent application Ser. No. 11/497,911, filed Aug. 1, 2006, entitled SYSTEM AND METHOD FOR ENABLING A USER TO CONTROL A CONTEXT OF A CLIENT DEVICE OF A BUDDY IN A SOCIAL NETWORK;

U.S. patent application Ser. No. 11/327,198, filed Jan. 5, 2006 entitled FRAMEWORK FOR DELIVERING A PLURALITY OF CONTENT AND PROVIDING FOR INTERACTION WITH THE SAME IN A TELEVISION ENVIRONMENT;

U.S. patent application Ser. No. 11/327,188, filed Jan. 5, 2006, entitled INFORMATIONAL ALERT MESSAGING FOR DIGITAL HOME SERVICES;

U.S. patent application Ser. No. 11/261,436, filed Oct. 27, 2005, entitled FRAMEWORK FOR DIGITAL HOME SERVICES.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to user interface navigation. More specifically, the present invention relates to the methods and software for allowing users to quickly navigate through a grid of scheduled data items, such as programs in an electronic program guide.

BACKGROUND OF THE INVENTION

Electronic, interactive program guides have become useful tools in helping television viewers identify programs they wish to watch. These guides, sometimes referred to as EPGs or IPGs, display programming items according to their broadcast time, channel, or other criteria. EPGs are widely available on different platforms, including on set top boxes, typically used with the provision of cable or satellite television services, on personal computers or mobile devices, and on the web as pages available from a web server. Yahoo!, Inc., the assignee of the present application, is the provider of one such web-based EPG application, available currently at www.tv.yahoo.com. Other EPG providers in various platforms include Gemstar TV Guide International, Scientific Atlanta, Echostar, TiVo, and Tribune Media Services.

Although other arrangements are used, a typical EPG is arranged in a grid with time on one axis and channels along a second axis perpendicular to the time axis. Program items are usually displayed by title within the grid, with the titles and many other attributes of the programs being stored in a database either on a computerized device (such as the step top box) local to the user or on a server accessible over a network such as the Internet. The user navigates the EPG grid by selecting buttons on a remote control, keys on a keyboard, or by moving a mouse. Depending on the particular user interface design, the user moves a cursor around the grid to a desired program item, moves the grid relative to a fixed cursor or highlight until a desired program item is displayed in the fixed cursor, or moves a floating cursor to the desired program item. The user may then select the program item to view more information about the program or select the program for immediate or deferred viewing or recording.

Due to practical display limitations, the EPG user interface only shows a limited amount of time intervals on a given screen, starting, typically, with the current time and showing the next two-three hours of programming. If a user wants to see programming available at different times, he or she continues to navigate backwards or forwards through time using the same techniques for navigating within the grid itself. For example, in the case of a moving cursor, the user would navigate the cursor to the end of the time axis in the grid, then continue navigation in the time direction, which brings on the next screen with additional time intervals and program items. In the case of the fixed cursor and moving grid, the user continues on to different time periods by simply continuing to navigate in the time direction and having those time periods scroll onto the display screen. In addition, some EPGs allow a user to input characters representing a specific time period and respond by displaying the program items available at the selected time period.

Given the increasing number of channels and program choices available to viewers, improved methods of more easily and quickly navigating through EPG data are desired. This is particularly the case since many more viewers are availing themselves of personal video recorders, such as those available from TiVo, Digeo, or many cable or satellite system operators, since viewers then have a keen interest in locating programs to record even if they are scheduled to air days or weeks in the future. The present invention provides such improved methods and corresponding user interface tools for allowing users to more easily and quickly navigate to future time periods in an EPG.

SUMMARY OF THE INVENTION

The present invention provides a quick and easy method to allow users to navigate through a time schedule. The time schedule interface facilitates a user viewing multiple time periods on an information schedule on a client device quickly without having to completely remake or redraw the entire interface.

According to an embodiment of the present invention a user of a computer or similar device is presented with a time schedule interface. This schedule interface may resemble a schedule such as TV guide or a train schedule. The schedule typically is composed of grids or blocks of information defined by two parameters. One parameter is almost always time, while the other parameter depends on the type of schedule. For instance in a TV guide example, the other parameter can be the different channels. The interface in this invention includes a moveable or scrollable virtual slider or slider thumb. The slider rests on or is attached to a time scale axis. This time scale axis may be implemented as a horizontal or vertical bar and in addition may contain markings corresponding to time intervals much like a ruler. A user may select and control this slider along the time scale axis. The position of the slider along the time scale axis controls the time periods displayed in the schedule.

The slider of the present invention allows quick feedback to a user. The grids of information are updated even as the slider is being dragged. A user can quickly determine which time periods to view and can swiftly decide to stay and move to a different time window with minimal delay. The schedule interface application which is executed on a client device has functionality that tracks the position of the slider along the time scale axis. The time position of the slider is used to update the current time schedule display. For instance, if the current time schedule displays a three hour window of TV time listings from 8 PM to 11 PM, the time slider usually will start at a position corresponding to 8 PM. A user may then control the slider to move it and then release the slider 3 hours further along on the time scale axis. The resulting effect would be to update the time schedule listings from 11 PM to 2 AM.

According to some embodiments, the time schedule is not just updated after it is finished being dragged, but the time schedule interface is updated while the slider is in motion. In the example previously mentioned, a user drags the slider three hours in relative time so that the time schedule window changes to three hours later (from starting at 8 PM and ending at 11 PM, to starting at 11 PM and ending at 2 AM). However in this embodiment, the schedule is updated continuously while the slider is moving. A user can see the schedule update according to the particular embodiment which may make the schedule update every fifteen minute or half-hour past the hour. In that embodiment, the schedule would only update if and when the slider reaches such designated times, such as 8, 8:15, 8:30, etc.

In further embodiments, the interface may determine for rounding purposes the closest time interval to the actual current time position of the slider. For instance, if a slider is moved such that it is at a position corresponding to a time of 8:28, the software rounds the time to the closest time interval, which is 8:30. In another embodiment the interface may round only by rounding down. In that embodiment if a slider is for example, at 8:28, the time schedule will be updated to closest time interval before it, which may be 8:15 if software is using fifteen minute intervals, or possibly 8:00 if using thirty minute intervals. The schedule would not be updated with 8:30 as the start time until the slider is at least at 8:30.

BRIEF DESCRIPTION OF THE DRAWINGS

The invention is illustrated in the figures of the accompanying drawings, which are meant to be exemplary and not limiting, in which like references are intended to refer to like or corresponding parts, and in which:

FIG. 1 illustrates a system for a time schedule application operating on different client devices in a network environment according to an embodiment of the present invention.

FIG. 4 presents a screenshot presenting a visual representation according to an embodiment of the present invention.

FIGS. 5A-5B illustrates two screenshot portions comparing a dropped slider position to a snapped slider position in accordance with an embodiment of the invention.

FIGS. 6A-6B illustrate a sequence of screenshots with a movable slider in an electronic program guide in accordance with embodiments of the present invention.

DETAILED DESCRIPTION OF THE PREFERRED EMBODIMENTS

Figure 2:
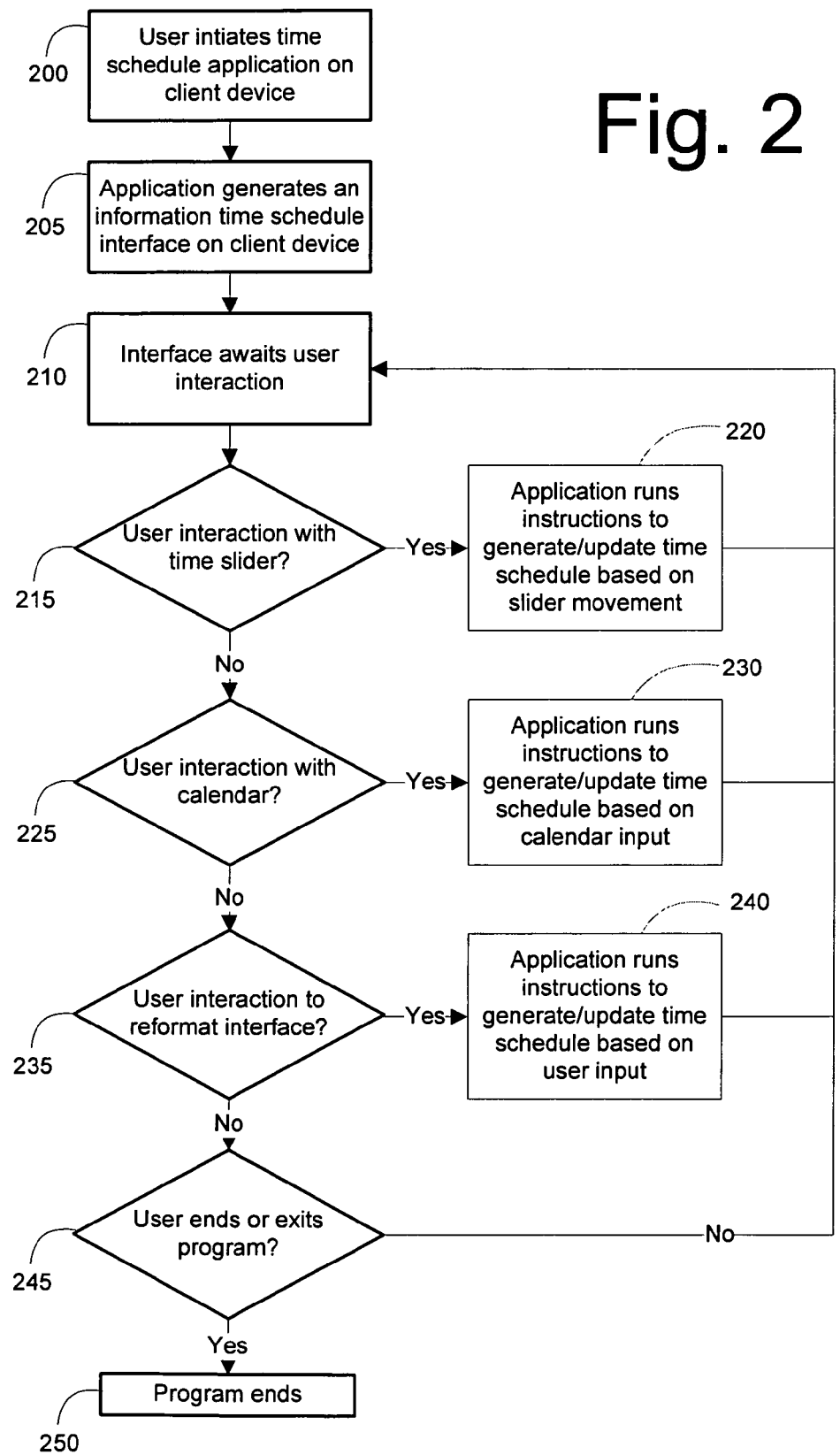
FIG. 2 is flow diagram of the operation time schedule interface application according to an embodiment of the present invention.

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

FIG. 1 presents a block diagram illustrating an environment in which various embodiments of the invention can be implemented. The diagram includes client devices 100 and 105 (computers), a set-top box 110, and a mobile device 115, on which the time schedule applications 102, 107, 112, and 117 can be run on respectively. These client devices as well as the time schedule application are connected to a content provider through a network 120. The content provider consists of Profile/Logon Component 142, UI Builder 144, and an Information Database 146. The network connection allows the client devices to contact the content provider for different purposes related to the invention.

There are many systems and platforms in which this invention may be distributed and used, as would be generally well known to those of skill in the art. In one embodiment the client device, a computer 100, may initially contact the content provider to download then run the application program on the client device. A computer 100 may contact a content provider through the Internet. In another embodiment, a set top box may contact through coaxial cable, telephone line, or fiber optics lines a content provider to receive the time schedule application or information related to it. Similarly a satellite set top box could receive the same information over space from a satellite used by a content provider. Alternatively, the schedule application could be pre-installed on a set top box or personal video recorder, which receives the program schedule data over a cable or satellite network. The content provider may be an ISP, a television provider, a Internet portal site, or some combination thereof.

The UI Builder 144 may contain the instructions and functionality to install and/or run the application on particular the computer 100 or the other client devices (105, 110, 115).

After the application has been installed, the computer 100 and time schedule application 102 may contact the content provider 140 to receive time schedule information from the information database 146. The profile/login component in 142 may also be contacted in order to identify the user of the client device which will affect some of the data transmitted from the information database 146.

FIG. 2 shows a process in which the time schedule application operates according to embodiments of the invention. The user of the client device starts the application accordingly with whatever device the application is on, step 200. In some embodiments the device is pre-installed on a computer and the user needs to select and open it. In another embodiment the application is run by visiting a particular web site, which supplies the application, written in a compiled language like Java or a scripting language like Javascript, for use while visiting the site. After starting the application, the application usually generates a time schedule, step 205.

Figure 4:
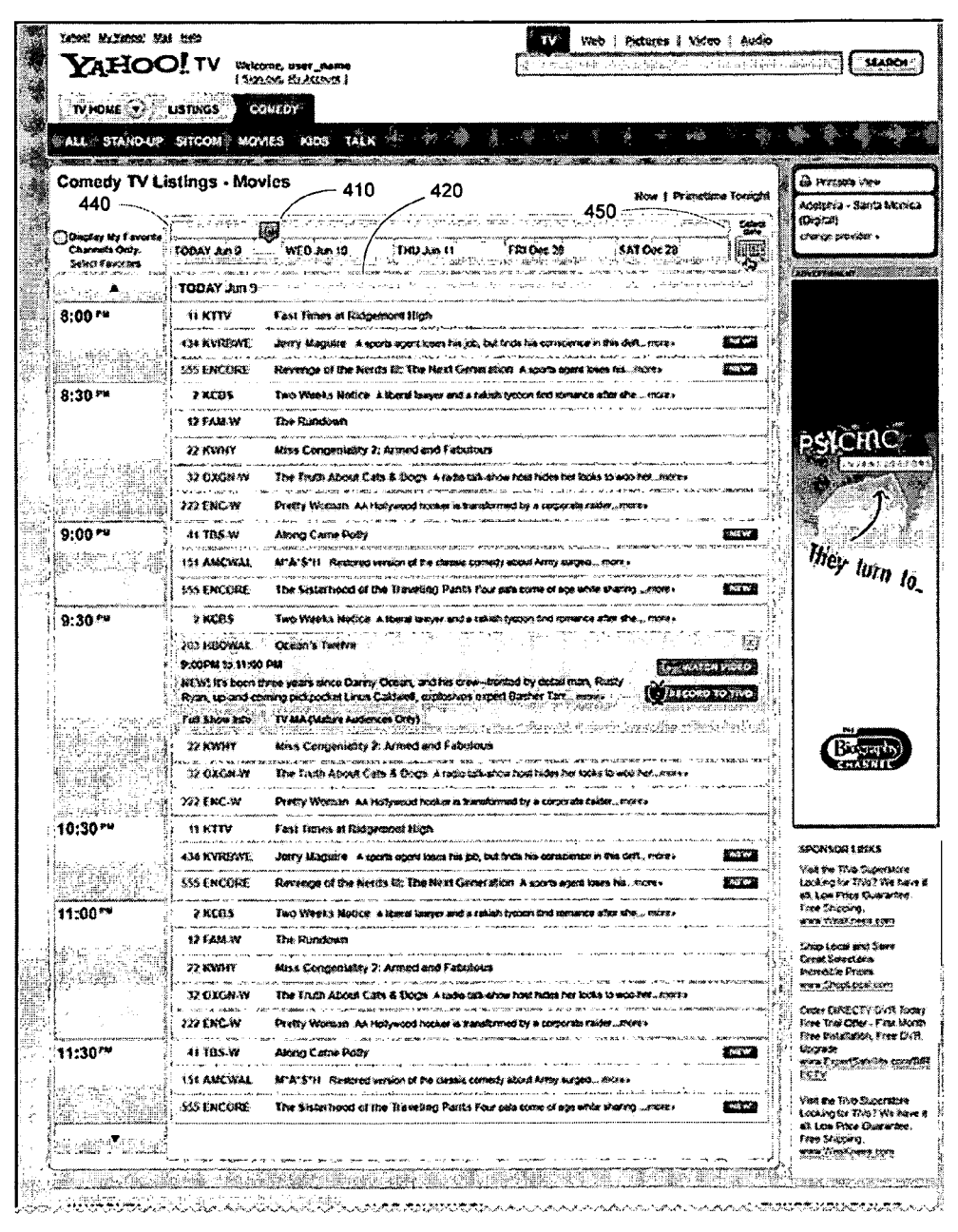

FIG. 4 shows one embodiment of the present invention in a browser environment. This shows a TV guide schedule interface with a slider 410 just above the schedule 420. The slider 410 includes a start point 440 and end point 450. The time schedule generated may be a current time schedule or may be based on user settings and user input. The information contained in the time schedule is accessed from an information database. This database may be located locally on the client device, or in another embodiment be accessed electronically from a remote location such as content provider server. The software application may download the information from a remote server as needed, or may download a subset of the information to have in anticipation of using it in the time schedule interface later.

The time schedule interface generally will remain static until a user interacts with it, step 210. In some embodiments the schedule may update as time passes to keep the schedule current. According to an embodiment, there are different ways in which a user can interact with the time schedule. This invention focuses on using a time slider to control and interact with the time schedule, step 220. The slider allows a user to control their window of interest with respect to the time schedule.

A user may also interact with the time schedule in other well-known ways. For example, the application may include a calendar date selection tool. If the user interacts with the calendar, step 225, it will usually be to select a date and possibly time in which the time schedule will be updated, step 230. For instance the calendar module could be in one embodiment a pop-up window, and the user simply selects a particular date. The time schedule would update the time schedule corresponding to the new date at same time it was at previously.

Alternatively in other embodiments a user may choose to an option to reformat the time schedule to the user's preference, steps 235 and 240. In one embodiment the user may want to filter a time schedule and limit the amount of entries displayed. All embodiments mentioned or known can be used with one another as appropriate. Finally a user may just view the interface and exit the program entirely, step 250.

Figure 3:
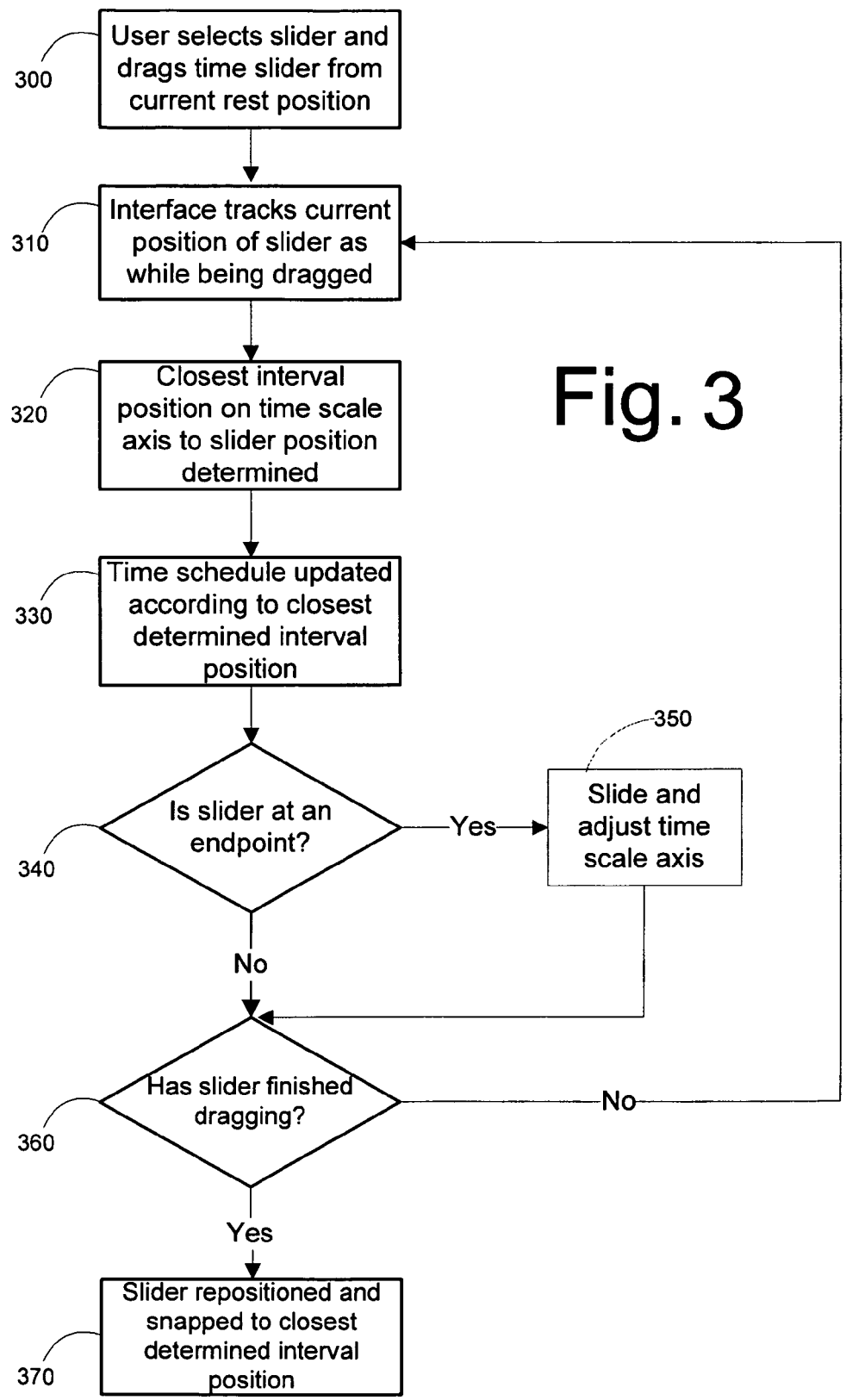
FIG. 3 is a flow diagram presenting a method for navigating a time schedule according to an embodiment of the present invention.

FIG. 3 shows a flow diagram representing an embodiment of how the time slider is implemented in the time schedule application. A user selects the slider and drags it from its starting position 300. The user does not necessarily need to manually drag and drop the slider. In other embodiments the user may select a portion of the time scale axis on which the slider is not on. For example, in a computer environment a user with a mouse cursor may click and hold on a specific different time and the slider will move towards this point until the user unclicks or the until the slider reaches that specific time. Or alternatively, an input box may be used to control the slider as well.

The time schedule tracks the position of the slider while it is dragged 310 in order to determine the closest interval position to the time slider 320. In some instances this closest interval position will be the as the actual position slider on the axis. Other instances, this position will be determined by rounding the current position of slider in some fashion on the time scale axis. The rounding may occur by rounding to closest interval, or rounding by always rounding up or down in a consistent way.

Once this closest interval position has been determined, the time schedule will update based on this information 330. The application will access the database according to the particular embodiment and use the information to update.

The time scale axis itself may also be updated based on the slider position 340. If the slider is moved at an endpoint of the time scale axis, the time scale axis itself may slide to present a longer or different period of time onto which the slider may be dragged and dropped onto 350. When the slider is at an endpoint the time schedule software recognizes this condition and may choose to move the time scale axis and slider together. If the time scale axis for example is representing a three hour window from 8 PM to 11 PM, a user may drag and drop the slider at position corresponding to 11 PM. The application will automatically slide back the time scale such that the time scale axis start point now corresponds to 11 PM. In other embodiments, the time scale axis can be slide different time amounts, such as only one hour. If using previous example the slider was dropped at 11 PM, the time scale axis would still have a time length of three hours but the beginning start point would correspond to 9 PM with slider still 11 PM, and the new endpoint being 12 PM.

After the slider has finished dragging at least temporarily 360, accordingly with the embodiment of FIG. 3 the slider may be moved by the application and snapped to the closest position interval. For example, if a slider is dragged to a position corresponding to 8:02 PM on the time scale axis, the application may reposition and snap the slider to 8:00 PM. FIG. 5 shows an embodiment where a slider is snapped dropped than snapped to a different position.

FIGS. 6A and 6B shows two manifestations of a sample electronic program guide interface according to embodiments of the present invention. FIG. 6A shows a guide interface including a time slider with TV program listings for selected channels. Listings for these selected channels are provided for a window between 8 PM and 11 PM. FIG. 6B reflects an updated guide after the slider has been moved to a time two hours later.

This time slider interface may be implemented in a web page using AJAX technology. AJAX, or Asynchronous JavaScript and XML, is a programming approach that utilizes some combination of technologies such as HTML, CSS, JavaScript, XML, etc. An AJAX approach allows the web page to feel more responsive as using incremental updates to interface without needing to reload or redraw an entire web page. An AJAX programming model regularly communicates small data in the background with a server in order to quickly update the page. Applications that use an AJAX approach require a client side program or script to have an independent communication with a web server. This independent communication can be used to exchange XML, or data in other formats, with a server through an XMLHttpRequest. An XMLHttpRequest is an API that may be implemented in JavaScript or another type of client-side script to return data.

An AJAX approach is well-suited to the present invention in which a slider is used to quickly update and change the time schedule user-interface. As the slider moves the client side program or script can asynchronously exchange data with a server. Then a client-side program or script such as JavaScript can interact with the data to update the current interface. In addition there are other methods such as using Flash, to create dynamic web applications that also communicate and exchange small amounts of data with a server.

In one embodiment, the slider program can be implemented on a web page using, at least in part, a specialized library. The library may provide functions that easily can generate a slider and contain functionality needed in the present invention. For instance the library may include event handlers that fire when the slider has been changed. This information of can then be used accordingly in a function to update the appearance of the slider.

For example, this type of slider or similar may be implemented in part using the Yahoo! UI Library (YUI). To use the Slider control, the following source files would be included in a web page with the script tag:

```
<!-- Namespace source file -->
    <script src = "yahoo.js" ></script>
<!-- Dependency source files -->
    <script src = "dom.js" ></script>
    <script src = "event.js" ></script>
        <script src = "dragdrop.js" ></script>
<!-- Slider source file -->
    <script src = "slider.js" ></script>
```

The Slider component is defined by YAHOO.widget.Slider.

Basic HTML/CSS Setup—To create a slider, ID references to two page elements would be added to the Web page: one for the slider background and one for the thumb. The thumb should be a child or the background element.

```
The thumb should be a child of the background element.
var slider;
function sliderInit( ) {
    slider = YAHOO.widget.Slider.getHorizSlider("sliderbg",
"sliderthumb", 0, 200);
}
The following example creates a horizontal slider object.
var slider;
function sliderInit( ) {
    slider = YAHOO.widget.Slider.getHorizSlider("sliderbg",
"sliderthumb", 0, 200);
}
```

The Slider instance in this example is configured so that it can be moved 200 pixels to the right, and 0 pixels to the left. It is also possible to configure the slider thumb to start in the center of the background, which would make the default landing zone or zero value is in the middle of the range. The getHorizSlider method produces a horizontal slider. The getVertSlider method produces a vertical slider. The full constructor for both may be implemented as:

```
YAHOO.widget.Slider.getHorizSlider(string bgid, string thumbid, int
    leftup, int rightdown, [int tick])
```

Where:
    bgid is the id of the slider background
    thumbid is the id of the slider thumb
    leftup is the number of pixels the slider can move left or up (depending on orientation)
    rightdown the number of pixels the slider can move right or down (depending on orientation)
    tick is the optional tick interval Setting Up Tick Marks—It is possible to allow the slider to move in fixed pixel increments instead of pixel by pixel. This is supported with an optional fifth parameter to the getHorizSlider and getVertSlider methods for the tick interval. The following will produce a vertical slider with tick positions every 20 pixels:

```
var slider;
function sliderInit( ) {
    slider = YAHOO.widget.Slider.getVertSlider("sliderbg",
"sliderthumb", 0, 200, 20);
}
```

Handling Slider Events—The Slider component has a change event that is triggered when the slider thumb is moved. The change event provides (as an argument) the number of pixels the thumb has moved from the position it was in when the component was initialized.

```
var slider;
function sliderInit( ) {
    slider = YAHOO.widget.Slider.getHorizSlider("sliderbg",
"sliderthumb", 100, 100);
    slider.subscribe("change", displayNewValue);
}
function displayNewValue(offsetFromStart) {
    // determine the actual value from the offset
    var newVal = (offsetFromStart + myStartVal * myScale);
    alert(newVal);
    // If animation is turned on this event fires continuously during
    the animation.
    // You can evaluate the moveComplete property to determine if the
    animation
    // is complete. Alternatively, use the slideEnd event.
    if (this.moveComplete) {
        alert("moveComplete");
    }
}
```

Sliders implemented with the YUI also have slideStart and slideEnd event handlers that fire the beginning and at the end of the slide operation:

```
var slider;
function sliderInit( ) {
    slider = YAHOO.widget.Slider.getHorizslider("sliderbg",
"sliderthumb", 100, 100);
    slider.subscribe("slideStart", function( ) {
        alert("slideStart");
    });
    slider.subscribe("slideEnd", function( ) {
        alert("slideEnd");
    });
}
```

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for navigating a user-interface showing a plurality of scheduled items arranged in a grid, the method comprising:
    displaying in a grid, items of information categorized by time periods in a time scale axis and by one or more specific labels in a second axis, wherein the items comprise plurality of television programs and wherein the second axis comprises a channel list;
    displaying a user controllable slider on the time scale axis that is located external to said grid;
    displaying an interactive time schedule associated with a first time period;
    allowing the user to control a window of interest associated with the interactive time schedule with the slider by selecting a second time period with the slider, said second time period being temporally non-contiguous with respect to the first time period;
    establishing one or more background asynchronous data communication processes; and
    in response to the user's movement of the slider, seamlessly updating the items of information displayed in the grid based on the current position of the slider along the time scale axis without reloading the user-interface screen, the asynchronous data communication processes retrieving the updated items of information to facilitate the seamless update.

2. The method of claim 1, comprising displaying uniformly spaced time intervals along the time scale axis.

3. The method of claim 2, comprising determining the current slider position as the slider is moved by the user.

4. The method of claim 3, wherein determining the current slider position comprises rounding the slider position to the time interval on the time scale axis closest to the current slider position.

5. The method of claim 4, wherein rounding the slider to the closest interval is performed after a user has finished moving the slider.

6. The method of claim 3, comprising adjusting the time scale axis to provide access to one or more different time intervals if the current slider position is at an endpoint of the time scale axis.

7. The method of claim 1, wherein the slider is positioned based on entering or selecting a specific time and date from a calendar module.

8. The method of claim 1, comprising accessing the time schedule user interface over a network from a content provider.

9. The method of claim 1, wherein updating the items comprises accessing the updated items in an information database.

10. The method of claim 9, comprising storing the information database on a computerized device local to user.

11. The method of claim 9, wherein accessing the items comprises performing a search for items in the database using as a search parameter a time interval selected by the user through movement of the slider.

12. The method of claim 1, wherein the user interface including the slider is run within an internet browser environment.

13. The method of claim 12, wherein the user interface and time slider component is implemented using a combination of Dynamic Hyper Text Markup Language, Flash, JavaScript, or Synchronous JavaScript and XML technology.

14. The method of claim 1, wherein the interface includes a second user controllable slider on the second axis.

15. The method of claim 14, wherein in response to the user's movement of the second slider, automatically updating the items of information displayed in the grid based on the current position of the second slider along the second axis.

16. The method of claim 1, wherein an application for generating the user interface is pre-installed on client device.

17. The method of claim 16, wherein the client device is a computer.

18. The method of claim 16, wherein the client device is a set-top box.

19. The method of claim 16, wherein the client device is a mobile device.

20. The method of claim 1, wherein selection of the non-contiguous second time period is a time period that does not immediately precede or follow the first time period.

* * * * *